US010324695B2

(12) United States Patent
Champagne

(10) Patent No.: US 10,324,695 B2
(45) Date of Patent: Jun. 18, 2019

(54) METHOD FOR TRANSFORMING FIRST CODE INSTRUCTIONS IN A FIRST PROGRAMMING LANGUAGE INTO SECOND CODE INSTRUCTIONS IN A SECOND PROGRAMMING LANGUAGE

(71) Applicant: NETFECTIVE TECHNOLOGY SA, Suresnes (FR)

(72) Inventor: Christian Champagne, Suresne (FR)

(73) Assignee: NETFECTIVE TECHNOLOGY SA, Suresnes (FR)

(*) Notice: Subject to any disclaimer, the term of this patent is extended or adjusted under 35 U.S.C. 154(b) by 285 days.

(21) Appl. No.: 14/780,477

(22) PCT Filed: Mar. 27, 2013

(86) PCT No.: PCT/IB2013/000723
§ 371 (c)(1),
(2) Date: Sep. 25, 2015

(87) PCT Pub. No.: WO2014/155148
PCT Pub. Date: Oct. 2, 2014

(65) Prior Publication Data
US 2016/0062753 A1 Mar. 3, 2016

(51) Int. Cl.
G06F 8/51 (2018.01)
(52) U.S. Cl.
CPC ...................... G06F 8/51 (2013.01)
(58) Field of Classification Search
CPC ..... G06F 8/30; G06F 8/36; G06F 8/41; G06F 8/427; G06F 8/51; G06F 8/40
(Continued)

(56) References Cited

U.S. PATENT DOCUMENTS 6,453,464 B1* 9/2002 Sullivan .................... G06F 8/51
717/136
6,519,617 B1* 2/2003 Wanderski .......... G06F 17/2247
707/E17.118
(Continued)

FOREIGN PATENT DOCUMENTS

WO WO 2007/000015 A1 1/2007
WO WO-2007000015 1/2007

OTHER PUBLICATIONS

International Preliminary Report on Patentability, dated Feb. 11, 2015, Application No. PCT/IB2013/000723.

Primary Examiner — Marina Lee
(74) Attorney, Agent, or Firm — Womble Bond Dickinson (US) LLP

(57) ABSTRACT

The present invention relates to a method for transforming first code instructions in a first programming language into second code instructions in a second programming language, characterized in that it comprises performing at a processing unit (11) steps of: (a) parsing the first code instructions according to semantic rules of the first programming language so as to generate an abstract syntax tree of the first code instructions; (b) mapping the abstract syntax tree into an architectural model of the first code in a knowledge description language; (c) analyzing the architectural model so as to identify design patterns representative of elementary software functions of the first code instructions; (d) enriching the architectural model with semantic tags determined in function of the design patterns identified and pattern matching rules, the semantic tags resolving semantic ambiguity within the architectural model; (e) transforming the tagged architectural model into model in a software modelling language independent from the first and second programming languages; (f) generating the second code instructions in the second language from the software modelling lan-
(Continued)

guage. The present invention also relates to a system for carrying out said method.

9 Claims, 7 Drawing Sheets

(58) Field of Classification Search
USPC .................................................. 717/120–149
See application file for complete search history.

(56) References Cited

U.S. PATENT DOCUMENTS

| | | | | |
|---|---|---|---|---|
| 8,813,024 B2* | 8/2014 | Akkiraju | ................... | G06F 8/35 717/104 |
| 8,943,472 B1* | 1/2015 | Ganelin | ................... | G06F 8/42 707/602 |
| 9,026,985 B2* | 5/2015 | Cornell | ................... | G06F 8/10 700/31 |
| 2006/0130009 A1* | 6/2006 | Cornell | ................... | G06F 8/10 717/136 |
| 2007/0006189 A1* | 1/2007 | Li | ................... | G06F 9/45516 717/141 |
| 2007/0256058 A1 | 11/2007 | Marfatia et al. | | |
| 2009/0006342 A1* | 1/2009 | Wong | ................ | G06F 17/30669 |
| 2009/0030671 A1* | 1/2009 | Kwon | ................... | G06F 17/211 704/2 |
| 2009/0313613 A1* | 12/2009 | Ben-Artzi | ................ | G06F 8/51 717/137 |
| 2009/0319981 A1* | 12/2009 | Akkiraju | ................... | G06F 8/10 717/104 |
| 2012/0192144 A1* | 7/2012 | Jalaldeen | ................... | G06F 8/51 717/104 |
| 2013/0007701 A1* | 1/2013 | Sundararam | ........ | G06F 11/3604 717/109 |
| 2016/0062753 A1* | 3/2016 | Champagne | ............. | G06F 8/51 717/137 |

* cited by examiner

MOVE 1 TO SH-ENTRY-DISTRICT OF IPM-PRICE-BASIS-INCLUSIONS OF RPL-OUT

FIG. 6a

◆ Move Statement MOVE
    ◆ Integer Literal 1
  ▲ ◆ Reads Of Expression
        ◆ Ref COBOL
    ▲ ◆ Reads Expression
           ◆ Ref COBOL
  ▲ ◆ Reads Of Expression
        ◆ Ref COBOL
    ▲ ◆ Reads Expression
           ◆ Ref COBOL
    ▲ ◆ Reads Expression
           ◆ Ref COBOL

FIG. 6b

♦ Assign Statement MOVE
 ♦ Integer Literal 1
▲ ♦ Reads Expression
   ♦ Ref COBOL "ipmPriceBasisInclusions.setShEntryDistrict(1);"

METHOD FOR TRANSFORMING FIRST CODE INSTRUCTIONS IN A FIRST PROGRAMMING LANGUAGE INTO SECOND CODE INSTRUCTIONS IN A SECOND PROGRAMMING LANGUAGE

FIELD OF THE INVENTION

The field of this invention is that of software modernization automation.

More precisely, the invention relates to a method for transforming first code instructions in a first programming language into second code instructions in a second programming language.

BACKGROUND OF THE INVENTION

Many IT organizations are suffering for aging technology and software engineer retirement.

Over the 50 past years, organizations created software that performs critical business tasks. However this software may put organizations at risk. Indeed software was written in "legacy" languages (i.e. out-of-date languages still in use, for example Cobol) for which software engineers massively retire and to which new engineers are not educated. Moreover the documentation of this software (design, business rules, application logic) is usually poor, often non-existent or was lost. Such a characteristic does not help to make business logic assets perennial nor allow new engineers to straightforwardly capitalize on existing software. Because of this, organizations are suffering from two main handicaps:

Programming knowledge is being lost. Maintenance costs constantly increase while agility (capability for change) stagnates.

Business knowledge is being lost. Making changes to software is more and more risky and business objectives may not be reached.

As a consequence the technical debt of software (i.e. the cost for maintaining an application to a given quality level or to restore quality to a target level) goes against organization objectives (alignment with new regulation, business change, capability to execute, cost of ownership).

Moreover organizations cannot rely on software that performs critical business when facing these risks:

Loss of skill: available skills on legacy programming languages are either junior (with very limited knowledge of the legacy system) or experienced developers which are about to retire. Therefore technical skills are either vanishing or, in the best case, actually succinct.

Loss of knowledge: business applications execute major and critical processes. Those processes usually are at the core of organizations strategy and expected progresses. Legacy software design documentation is usually limited when not lost. As a consequence new programmers may not be able to get access to it nor retrieve business logic prior to performing change requests. This is error-prone and may cause deplorable business impact. This is a direct technical debt impact.

Gap between deployed applications and the code base stored in configuration management repositories: application life cycle management (compilation from source, automatic deployment) is usually not automated for legacy business applications. It is not unusual that code base is altered and new releases of applications are deployed without impacting the configuration management. As a consequence the system in use may differ from the code base that is saved in configuration management repositories. Any future change impacting the code base stored in repositories will erase unsaved changes (they exist only in production code base).

Technical debt and cost of ownership: legacy application design and implementation are under influence of the constraints of their aging programming language. Years and decades of maintenance and evolution make those applications costly to maintain and make evolve; at the same time, resources are becoming rare. Therefore the cost of ownership of those systems is high.

Regulation change: some industries must constantly adapt to new regulations (banking, energy . . . ). It is key for applications in constant change that business logic is preserved at design level (i.e., in a technology-neutral form) and that all technical artifacts are automatically derived from design models that aim at preserving the business logic assets.

To solve these problems, it has been proposed to transform legacy software to more current platforms having wider acceptance, which is called "modernization".

Modernization from legacy technology to new technology is often requiring significant manual intervention. Manual work is error-prone due to the size of large legacy software that cannot be fully managed by a human mind (complexity, volume of algorithms and information). Hundreds and even thousands of man-days are required to modernize average legacy software.

A first automated approach is line-by-line transformation where all tokens [statements and keywords of the language, variables] in one line of code are transformed into a new line of code that performs the same operation. This thoughtless transcription ("we do not know what it does but it does the same") of software from old technologies to new ones simply moves the technical debt to the new code base.

More advanced approaches are based on logic extraction. Patterns are used to identify semantics so as to understand what does each section of code versus how it does it. Such an approach is presented in international application WO2005069125.

However, as of today, automated modernization solutions still suffer from unacceptable limitations:

Transforming software based on programming languages (Cobol, fourth-generation languages) prior to the object-oriented paradigm stumbles over the "structured programming" paradigm. Moving to object-orientation, Service-Oriented Architecture (SOA) principles requires appropriate modernization concepts, techniques and tools. Therefore existing approaches does not significantly remove technical debt.

Transformations applied for modernizing software are similar to decompiling and recompiling programming languages. Therefore it is highly complex or even impossible for users of modernization systems (methods, tools . . . ), to customize transformations. As a consequence it is very difficult to modernize all the legacy code because of ambiguities in legacy code semantics and numerous exceptions to design patterns.

Modernization systems mostly use a kind of internal pivot representation formalism to carry out transformations. Legacy code base is transformed through the use of parsers relying on this pivot formalism. However this pivot is seldom based on public standards. Therefore even if users of modernization systems may create tailored transformations to manage semantic ambiguities, it may be risky to invest in specific modernization products. Data and code volume, business criticality of applications, sustainable investment and so on thus impose open standardized products.

There is consequently a need for a method enabling describing, managing and executing semantic transformations in order to retrieve the business logic from the legacy system in such way that (a) the retrieved logic is independent from the legacy technology, that (b) it can be automatically transformed into the new code base and new database which are fully compliant with the new architecture and are no longer suffering from the technical debt of the legacy system, and that (c) it is markedly faster than any known computer and/or human method.

SUMMARY OF THE INVENTION

For these purposes, the present invention provides a method for transforming first code instructions in a first programming language into second code instructions in a second programming language, characterized in that it comprises performing at a processing unit steps of:
(a) parsing the first code instructions according to syntaxic and semantic rules of the first programming language so as to generate an abstract syntax tree of the first code instructions;
(b) mapping the abstract syntax tree into an architectural model of the first code in a knowledge description language;
(c) analysing the architectural model so as to identify design patterns representative of elementary software functions of the first code instructions;
(d) enriching the architectural model with semantic tags determined in function of the design patterns identified and pattern matching rules, the semantic tags resolving semantic ambiguity within the architectural model;
(e) transforming the tagged architectural model into software modelling language independent from the first and second programming languages;
(f) generating the second code instructions in the second language from the software modelling model.

This method focuses on automating 100% of the modernization process while allowing users of the invention to refine and add existing concepts and associated transformation rules. The latter action in essence meets standards and relies on openness. Indeed legacy applications are not homogeneous and many different programming languages, database technologies, design patterns and coding practices may have been applied over years. Moreover, those elements may have changed over years and managing the variation is important. In addition, it is possible that the same lines of code need to be transformed differently according to the context. Indeed, semantics of legacy blocks of code may match to many and completely different design patterns in the new architecture for which the application is to be modernized. Therefore users may need to add information to the Knowledge Base of the modernization system in order to manage and maintain with full atomicity and transparency all possible semantic ambiguities that may exist in the legacy code base.

Moreover, the present method allows interacting with the existing transformations. This is achieved through the use of analysis views (to understand architecture and coding practices in use, to foresee the transformation results and apply refactoring), transformation wizards (to change the refining and refactoring processes) and annotations (to force semantic interpretation, with atomicity down to a single statement and associated context).

All transformations are managed in a Knowledge Base so that individuals may use new and homemade transformations for their own project. They can also share and promote additional transformations and concepts they may have created. All transformations and concepts are based on industry standard meta-models, namely: KDM, ASTM and UML2 meta-models. KDM, ASTM and UML2 are open standards managed by the OMG. They are well documented and used by many organizations worldwide.

Those standards are essential because:
They enable software engineers to extract a platform-independent model out of the existing code base, thus allowing semantic transformations that get rid of legacy technical influence and constraints while making all business and application logic emergent and perennial,
They apply to any legacy architecture and any object-oriented target architecture including newest SOA and cloud computing platforms,
They allow a 100% automated process to modernize all legacy application artifacts (in charge of application behavior) from the legacy code base toward the new architecture,
They can be used jointly as a true pivot architecture (both code and data) description language—from application overall structure down to code statements and tokens. This allows to factorize transformations from KDM/ASTM to UML2 (design models with full details), whatever the target and legacy architecture,
They allow a 100% transformation from UML2 models to a new code base, therefore ensuring design equals to implementation,
They allow making application change at UML2 design level and thus sharing business knowledge in a fully open, neutral and friendly way,
They enable to make the target architecture vary so that this architecture matches with organization requirements without the need for a specific runtime (often proprietary) framework.

As a consequence previous limitations for modernizing applications are overcome and the following goals are met:
Retrieve, explain, preserve and nourish business logic,
Decrease the number of resources requiring architecture skills,
Make the target architecture vary as time goes by and protect applications for being tied to aging languages and technology,
Remove technical debt because the application is fully re-architectured; only business rules and application logic are preserved for deferred evolution and possible (automatic) re-implementation,
Allows today's human resources (programmers, software engineers, business analysts) to maintain and make evolve modernized applications,
Manage semantic ambiguities along the modernization process in order to reach 100% automation and offer competitive pricing for ambitious modernization projects with real scalability challenges (high volume of code [up to multiple tenth of millions of lines of code], high volume of data [terabyte of data], need for performance [millions of transactions daily and 50% of data updated by batch every night]). For the same amount of work, a person alone would need several years.

Preferred but non limiting features of the present invention are as follow:

steps (b) to (f) are performed according to a knowledge base, said knowledge base describing:
  a list of concepts of the first programming language and of the second programming language, said concepts being expressed as meta-elements, meta-relationships and meta-rules;
  A list of elementary actions associated with concepts;
  A list of conditions for elementary actions triggering.
the knowledge base is a customisable base;
modification of the knowledge base is suggested to a user when unknown design patterns are identified;
the first code instructions are associated with a first database in a first format compatible with the first programming language, the method comprising a further step (g) of converting the first database into a second database in a second format compatible with the second programming language;
the method comprises a further step (h) of executing the first code instructions on a sample first database, executing the second code instructions on a sample second database, and comparing respective results so as to test the reliability of the second code instructions;
step (e) comprises a further step (e1)) of modifying said meta-model so as to enhance functionalities of the first code instructions;
said software modelling language is UML2.

In a second aspect, the invention provides a system for transforming first code instructions in a first programming language into second code instructions in a second programming language, the system comprising processing means configured for performing the method according to the first aspect of the invention.

BRIEF DESCRIPTION OF THE DRAWINGS

The above and other objects, features and advantages of this invention will be apparent in the following detailed description of an illustrative embodiment thereof, with is to be read in connection with the accompanying drawings wherein:

FIG. 6a-6e illustrate an example of first code instructions transformed using the method according to the invention.

DETAILED DESCRIPTION OF A PREFERRED EMBODIMENT

Figure 1:
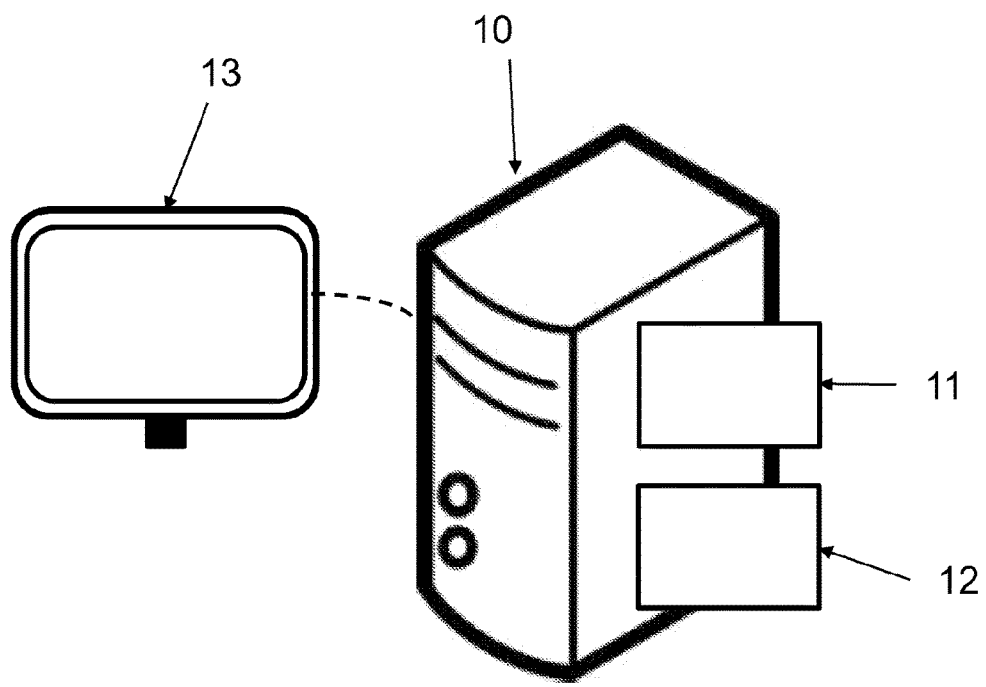
FIG. 1 represents a system for performing the method according to the invention.

Referring to the drawings, a method according to a possible embodiment of the invention will now be described.

System Overview

The present method for transforming first code instructions in a first programming language into second code instructions in a second programming language is performed by equipment 10 as represented by FIG. 1.

This equipment 10 may be any server comprising data processing means 11 (for example a processor), data storage means 12 (for example a hard drive disk) and interface means 13 (for example a display, and keyboard/mouse).

The processing means 11 are configured to receive the first code instruction, in particular as a text file, and output the second code instruction, also as another text file. Both code instructions may be displayed on the interface means 13.

Generally, the first programming language is a legacy programming language and the second programming language is a current programming language, but any combination is possible.

It is to be noted that the first and second programming languages may actually be the same language. Indeed, there is a plurality of "styles" within a single programming language (a single function may be programmed in many different ways), and the present method may be useful for transforming a first style into a second one (inside a single programming language).

Moreover, the transformation may be "refactoring" (i.e. restructuration of models of the code and its structure without changing its behaviour), but also "refining" (in which semantics of the models of the code are enriched).

The present method comprises steps (which are to be detailed in the following description) of:

(a) parsing the first code instructions according to semantic rules of the first programming language so as to generate an abstract syntax tree of the first code instructions;

(b) mapping the abstract syntax tree into an architectural model of the first code in a knowledge description language;

(c) analysing the architectural model so as to identify design patterns representative of elementary software functions of the first code instructions;

(d) enriching the architectural model with semantic tags determined in function of the design patterns identified and pattern matching rules, the semantic tags resolving semantic ambiguity within the architectural model;

(e) transforming the tagged architectural model into a software modelling language independent from the first and second programming languages;

(f) generating the second code instructions in the second language from the software modelling language.

Figure 2:
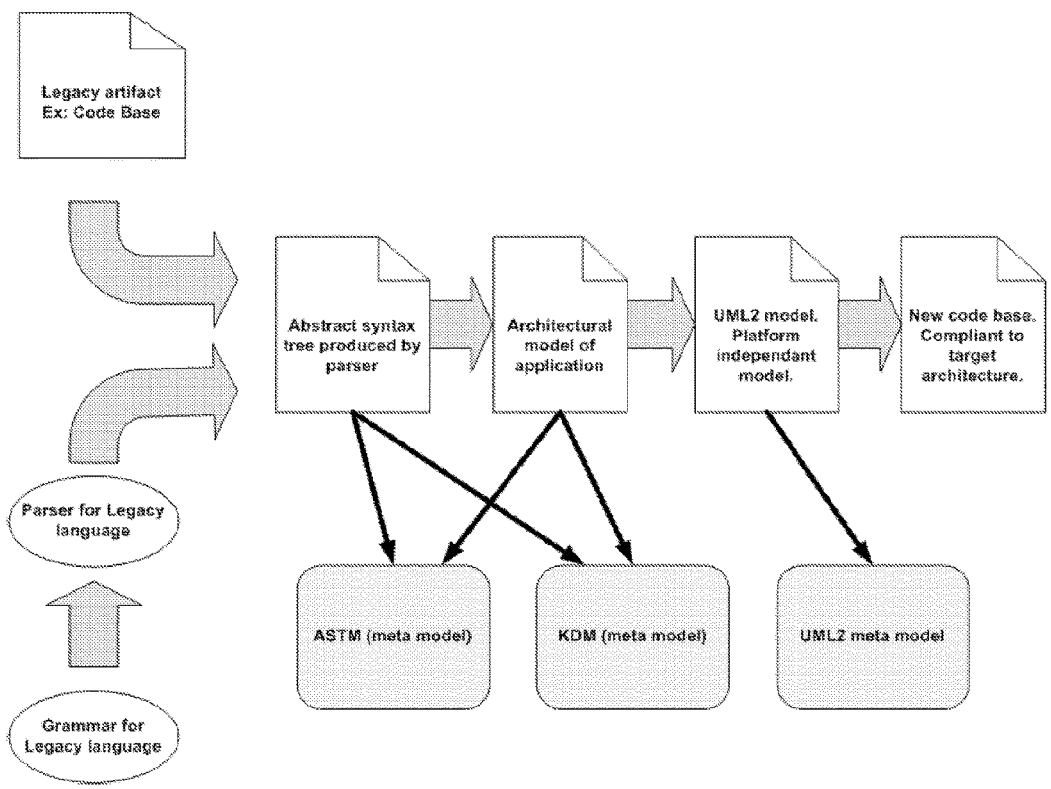
FIG. 2 is a diagram representing steps of the method according to the invention.
Figure 4:
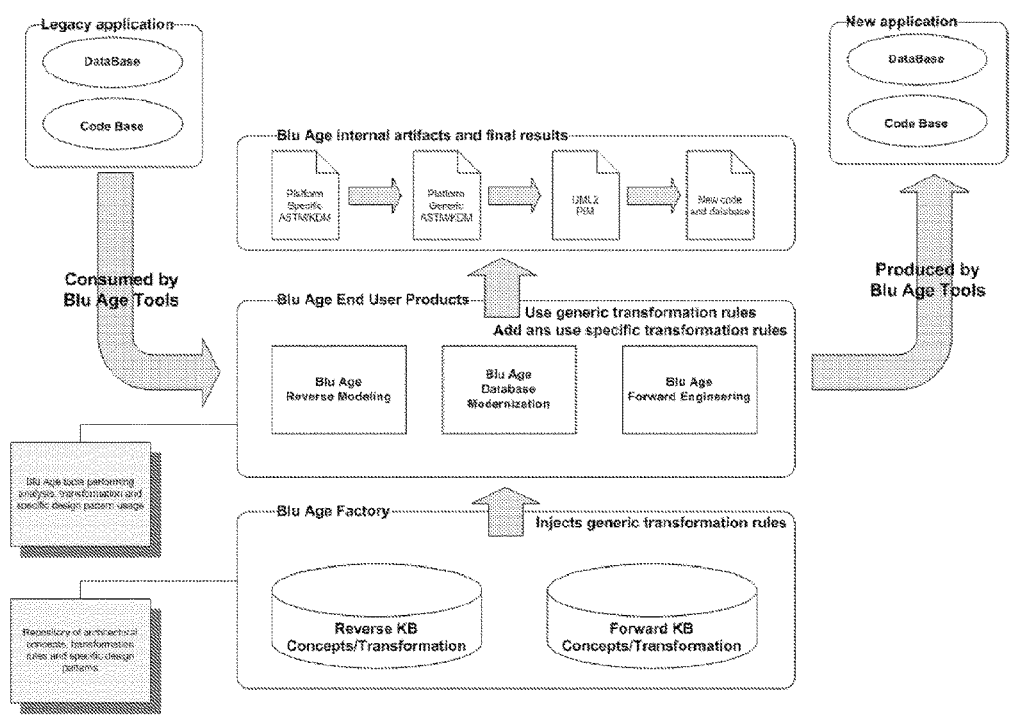
FIG. 4 is a general representation of components of a preferred embodiment of the method according to the invention.

Said steps are illustrated by FIG. 2. Tools for performing the method are represented by FIG. 4.

Parsing of the First Code Instructions

In the step (a), the raw code is read then parsed according to known technics. Semantic rules of the first programming language are used to identify the "grammar" of the first code instruction. An Abstract Syntax Tree (AST) is generated, advantageously according to the Abstract Syntax Tree Metamodel (ASTM), which is an industry standard managed by the Object Management Group (OMG).

The OMG is an international, open membership, not-for-profit computer industry standards consortium. OMG Task Forces develop enterprise integration standards for a wide range of technologies and an even wider range of industries. OMG's modeling standards enable powerful visual design, execution and maintenance of software and other processes. Originally aimed at standardizing distributed object-oriented systems, the OMG now focuses on modeling (programs, systems and business processes) and model-based standards.

An AST is a tree representation of the structure of a source code (here the first code instructions), this tree is no longer a text but already a model.

AST are produced from parser programs that transform text (code base) into a model by using the grammar of a programming language.

Knowledge Base

One of the strengths of the present process is the use of a Knowledge Base (KB), according to which further steps of the present method (i.e. steps (b) to (f)) are performed.

The KB is a central repository, stored on the storage means 12, in which data for all transformations is contained. This data is used by rule engines implemented by the processing means 11.

The role of the Knowledge Base is to define how legacy artifacts (first code instructions, and also first database, as it will be explained later) are transformed into intermediate models to finally be transformed into new artifacts (i.e. the second code instructions, and the second database) conforming to the new target architecture specifications and constraints. Furthermore, the goal is to retrieve and preserve the semantics of the logic of the first code instruction (what it does, not how it does it) so that the new implementation delivers the same services along with the same behavior as the original application. However, the new implementation IS NOT a straightforward "translation". By "straightforward translation", it is meant a syntactic transformation of code based on a line-by-line or statement-by-statement approach applied to all lines.

Instead, the major effect of the present method is design through actual creativity: it creates the new application as if it had been initially developed for the target architecture.

This goal can only be achieved if the design of an application can be formalized and modeled based on a platform-neutral approach. Accordingly, the KB advantageously defines:

- a list of concepts (i.e. platform-neutral architectural and coding principles) of the first programming language and of the second programming language, said concepts being expressed as meta-elements, meta-relationships and meta-rules ("concept" here has the meaning of "abstract high-level object" in the sense of classic conceptual data models in which concepts and their relationships define graphs);
- A list of elementary actions associated with concepts (actions enabling the transformations, to combine, refine, modify and refactor concepts);
- A list of conditions for elementary actions triggering, to decide when transformations apply by evaluating the existence and values of a set of concepts and optionally the execution of other transformations.

The starting points of all transformations are the said "concepts", which are elements of the Knowledge Base in charge of the semantics. Elements describe the architecture (both the legacy and target architecture), code base and database design, concrete implementation of code base and database, design patterns and semantic annotations. Concepts are consumed as inputs and outputs of transformations.

Transformations are in charge to identify concepts that need to be preserved and later transformed, from those that need to be discarded. These do not contain application logic semantics. Instead, they are characterized by their inappropriate adherence to the legacy platforms. In order to achieve its goal, all concepts and associated transformations are defined in a platform-neutral way.

Model Mapping

Figure 3:
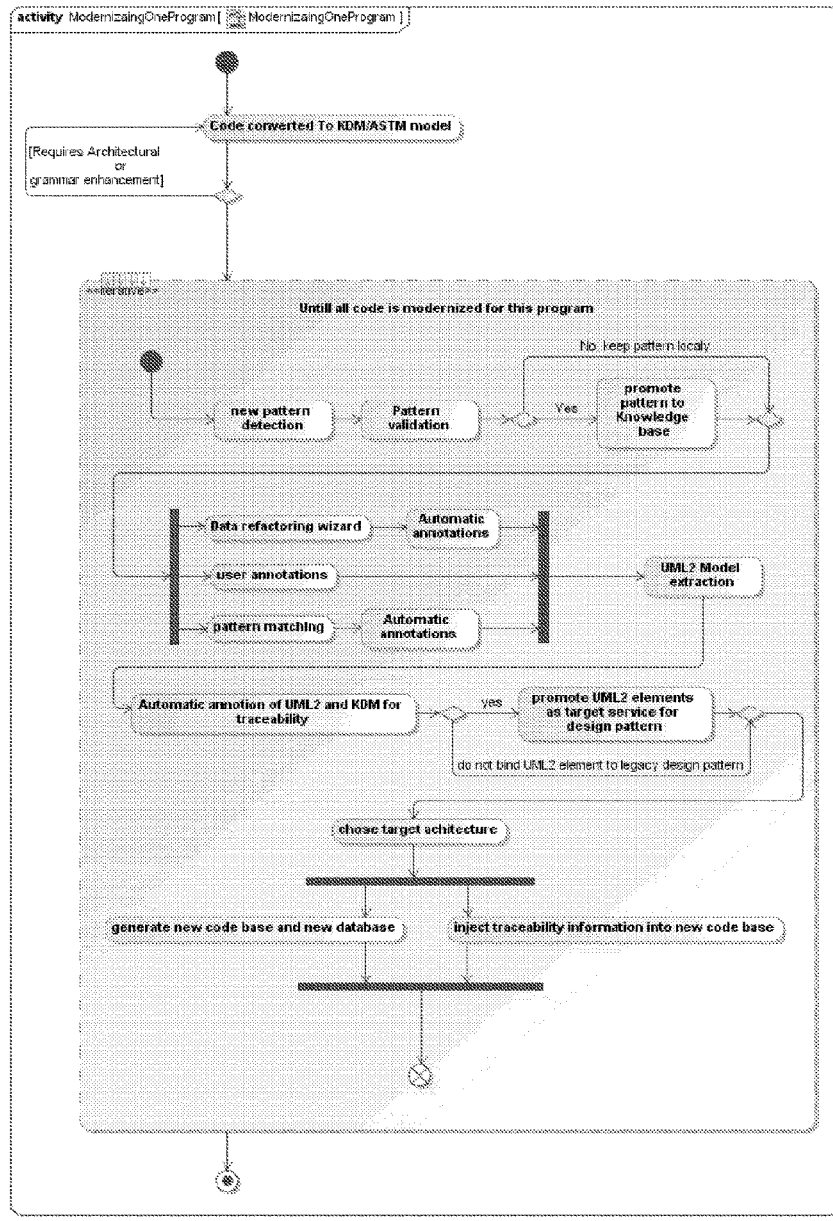
FIG. 3 is a diagram representing steps of the method according to a preferred embodiment of the invention.

In a second step (b), the AST is mapped into an architectural model of the first code in a knowledge description language. In this step, the processing means 11 keeps extracting the application logic out of the first code instructions. This steps and the following one are detailed by FIG. 3.

Advantageously, this architectural model is according to the Knowledge Description Meta-model (KDM). Which is also an industry standard managed by the OMG. KDM is used to formally describe Concepts and Transformations. KDM is used to retrieve the macro-structure of the architecture (packages, call structures, data structures . . . ) while ASTM is used to retrieve algorithms inside functions.

KDM and ASTM are particularly adapted for common use (to describe "concepts"), and enables achieving platform independence. However, the present method is not limited to these standards.

KDM is a generic open standard that enables describing architecture and software implementation with atomicity down to individual statements. KDM is designed to describe architecture by splitting apart platform information from architectural concepts and code implementation. Therefore KDM is used to make the business assets of the legacy semantics emergent; it progressively gets rid of the code that is tied to the legacy platform. Typically KDM is used for service definition, service call, data structure and user interface definition.

ASTM is a generic and platform-independent standard also managed by the OMG. ASTM is a companion to KDM and has been designed to manage statements and tokens with full atomicity while preserving ASTM models from being too big. Indeed KDM is very verbose and KDM models are very large when used to model an application with atomicity (down to individual statements for each line of code).

The FIG. 6b represents an example of ASTM/KDM model generated from the code instructions (in COBOL) of FIG. 6a. As it can be seen, the resulting model is very big with respect to the original code instruction (one line).

Pattern Matching

In a further step (c), the architectural model is analysed so as to identify design patterns representative of elementary software functions of the first code instructions.

Indeed, the applicant has noticed that more than 80% of the volume of code instruction is constituted of "grey code", i.e. purely syntactic code which acts as a frame for the application, and which is meaningless. The grey code does not comprise any application logic, and trying to understand it is a waste of time.

Consequently, the present method proposes to identify the "useful" remaining 20% thanks to design patterns. In software engineering, a design pattern is a general reusable solution to a commonly occurring problem within a given context in software design. The same design pattern may have different concrete implementations in the code base while performing the same function (in other words, for a given elementary software function, are recognized a plurality of "implementation patterns" which are mapped to a "design pattern" of the software function). The rest of the code instructions (i.e. the grey code) is ignored.

The present method fundamentally manages design patterns in order to handle variations both on design pattern definition and implementation. Thus, the present method multiplies up to five the processing speed while facilitating detection of unusual implementation of functions.

Figures 6C, 6D, 6E:
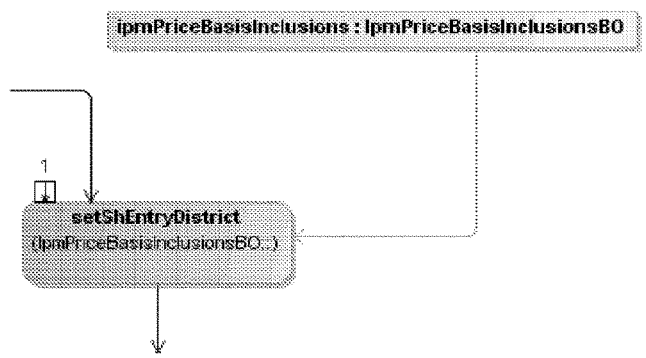

As represented by FIG. 6c, the analysed architectural model is sensibly lighter than the ASTM/KDM model of FIG. 6b.

In order to instrument the identification of design patterns in the legacy application, it is known to scan the instruction code with regular expressions; however this process is suffering from the following limitations:

the core structure of each pattern has to be is investigated,

Regular expressions are syntax-based and are not convenient to manage variation in text fragments with the same meaning (simple examples: if (a EQUAL B), if (a IS EQUAL B), if (a IS EQUAL TO B), if (NOT a IS DIFFERENT FROM b), etc.).

The present pattern recognition mechanism uses a different process: it browses the KDM models which can be processed as a graph. However, the transformation to KDM models is such that all semantic variations converge to individual KDM concepts. It is therefore possible to browse KDM models that are not suffering from semantic variation and compute "graph signature" by analyzing self-contained clusters of KDM elements.

The pattern engine then suggest patterns, each is identified with a unique identifier and matching elements in the KDM are displayed. KDM elements are linked to the first code instructions in order to name program (file) name, line number and text of the code base that potentially matches. Each pattern match is displayed with a variability score to decide it this is really a match, if it is a match but requires some adaptations (like ignore type of second variable) or if it is a false positive.

As it will explained after, advantageously the user may then decide via the interface means 13 which pattern to validate, which to use to automatically annotate the code. The user may as well publish the pattern to the Knowledge Base so that other users benefit from it.

Patterns can be edited later on. Undo matching is possible if pattern matching occurs to identify and annotate elements that the user want to modernize with a different strategy.

Annotations & Ambiguities

Ambiguity is a property of code lines which may be reasonably interpreted in more than one way, or reasonably interpreted to mean more than one thing.

Several types exist, for example:

A—Imagine a C function that manipulates an array of bits (Boolean value, 0 or 1) to shift all elements onto the left. This can be used either to:

Manage a decision queue, each bit in the array represents an element to be processed, the leftmost bit indicate whether or not trigger an action (0: do not process, 1 process), then all elements are shift to the left and the new leftmost bit is analyzed.

Multiply by two: when multiplying by two the machine is shifting all bits in the array to the left. C programming language has access to memory directly and can perform a multiplication by two this way (rather that by doing "var=var*2;").

B—JCL is used for COBOL application to organize batch, they are files made of hundreds of lines of code, sometimes thousands. However most information in JCL is in charge of:

Managing execution time and compute associated cost,

Sorting and merging input and output files,

Estimating the number of pages for a report generated by a batch,

Managing spaces consumed by dataset . . . .

If the new architecture replaces a file-based repository with a relational database, usually, the only information to retrieve from the JCL is the merged information in order to add JOIN statements when accessing data in the new architecture. Transforming the existing JCL in equivalent Java code would be useless, would increase budget and would go against modern design principles.

C—The legacy code below is a CICS transaction to push data into a queue. Typically any of the following is potentially true:

Option 1: data is sent to another program so that data is used remotely for computing other data, Option 2: data is shared by multiple programs so that all share the same information, Option 3: data is sent to a database to be persisted.

Ambiguity can only be solved by analyzing consumers of the CICS queue. Therefore, it is possible to retrieve both the architecture layer of the reader of the queue and the type of processing involved. With that information, it becomes possible to identify which of the different options is correct for the context of analysis.

| | |
|---|---|
| Legacy code | EXEC CICS WRITEQ TS QUEUE (WS-TS-NOM) FROM (WS-TS-DATA) LENGTH (WS-TS-LENGTH) END-EXEC. |
| Java potential equivalent #1 | Service call with parameters |
| Java potential equivalent #2 | Assigning value to a singleton or data is sent using event broadcasting like Java Message Service (JMS) |
| Java potential equivalent #3 | Synchronizing elements (e.g., data access objects) in memory with databases when elements' states change (Java Persistence API technology) |

Solving the ambiguities is the major problem of known methods. The only solution is generally human intervention.

The present method proposes a further uses of the identified design patterns with a step (d) of enriching the architectural model with semantic tags (also called "annotations") determined in function of the design patterns identified and pattern matching rules, the semantic tags resolving semantic ambiguity within the architectural model.

As a consequence the volume of artifacts to be modernized is significantly reduced, refactoring is simplified and contextual ambiguities can be easily resolved: the semantic tags contain information for choosing the right interpretation of the code between pluralities.

Semantic tags are means to add semantics to the KDM model in order to:

Use them as parameters in existing transformations:

For instance the <<job step>> tag will transform the line of code to which this semantic tag is applied into a step in a batch. All the logic will be modernized as a service, but <<job step>> will also create an upper service (the step). The underlying service may be reused for online and synchronous transaction, however the step will embed the call to that service and this step is part of a batch (asynchronous service). The usage of this service in this context (step) creates additional artifacts and different target architecture.

Do refining at KDM level based on user decision:

For instance: splitting a large block of procedural call into multiple service calls. New signatures of services are created based on dataflow analysis based on the code boundary defined using the "modernized as" tag.

Do refining at KDM level based on pattern recognition:

The goal of pattern recognition is to identify structured and repetitive blocks of code that must be transformed into very different implementation shapes. Typically algorithms used to manage date computation, string manipulation, data exchange between application components, transaction to database fall in this category. Usually the paradigmatic gap between legacy and target architecture is so huge that a "translation" would damage the modernized application (maintainability, performance, compliancy with coding principles . . . ). Moreover legacy languages are usually using lower abstraction; it is quite common that "programming framework" and associated APIs had been created to add abstraction. In this case the semantics is attached to those APIs.

In order to identify and map first code patterns to object oriented constructs and service oriented architecture, the process is as follows:
  Defining first code pattern structure:
    Either using regular expressions,
    Or by using the KDM model structure and type of model elements of the application to carry out graph analysis.
  Comparing patterns to code [for regular expressions] or to KDM model [for graph analysis] (complete application, list of programs, selection of code within program),
  Analyzing matching elements and matching score (a view display each match with file name, line number and matching score),
  Validating matching elements, in which case semantic tags are added to the KDM model for all matching elements.
  Ignore legacy code:
  Skip: this semantic tag is used to remove legacy code that does not need to be modernized ("How it does" versus "what it does", dead code).
  Change the semantic of individual lines of code or even individual statements:
  Semantic tags applies to blocks of code, lines of code, statements, groups of work and keywords, individual words,
  Semantic tags may be combined (for instance 10 lines tagged with one annotation, and some elements while those lines are tagged with another annotation).
  By using meaningful semantic tags, it is actually possible to enrich or alter the semantics of KDM models prior to their transformation into meta-model (see next step). It is possible then to use user input information (as visible in FIG. 3) to change transformations, to apply functional refactoring, to manage ambiguities which require user expertise, evaluate and validate contextual information for a section of code to remove ambiguities, use design patterns to replace matching elements which a new implementation. Semantic tags are used both at program level, block of code level, line of code level and statement level.
UML2

In a step (e) the tagged architectural model is transformed into a meta-model in a software modelling language independent from the first and second programming languages, the software modelling language being for example Unified Modelling Language 2 (UML2). Other versions of UML or other standards are nevertheless possible.

This transformation of KDM to UML2 is called "transmodelling". UML2 models are generally graphical models.

UML2 is preferred because of its efficiency with ASTM/KDM. KDM and ASTM are used to extract the application logic out of the first code instruction and allow removing ambiguities in an iterative mode. Nonetheless, the pivot model used between the reverse engineering and the forward engineering phases is UML2 to make the business logic and information semantics of the legacy system both open and evolvable. The resulting Platform-Independent Models, which formally describes the business logic, are readable by any business analyst or software engineer thanks to UML2 and extensions belonging to the invention: "profiles" in the UML2 jargon. UML2 is suitable for understanding and (re)-designing a software system with details, but it is not an executable language (UML2 is suffering from limitations which prevent models from "compiling" or "executing on a virtual machine"). In order to endow UML2 with execution capabilities, the invention uses specific UML stereotypes, namely annotations packaged in profiles that guide the way by which UML2 elements in models map to executable artifacts in the target platform. So, a fully automatic process "compiles" the computed-by-reverse UML2 models toward the target implementation support with no need for any handwriting of the code base.

Concepts involved in the reverse engineering phase are described using ASTM and KDM. Reverse engineering transformations produce output models compliant with KDM and ASTM. Only the last set of transformations produce UML2-compliant models decorated with the invention's homemade stereotypes.

Concepts involved in the forward engineering phase are described using KDM and UML2 meta-models. To that extent, KDM is used as a pivot formalism to describe and organize transformations while UML2 is used as a pivot formalism to understand logic and semantics assets coming from the legacy application. These assets are starting points for any opportunistic evolution to meet critical requirements in terms of information agility, availability . . . and to address economic issues in general.

The very final extracted UML2 models are independent of, both the first and second programming languages (technology-agnosticism). This enables removing the influence of the legacy technology and achieving malleability with target architecture constraints and specifications.

This final UML2 model is the fully detailed functional specifications of the software, containing all the semantics of both the logic and the behavior of the legacy software. "Technical only" code is not modernized (for instance, for a transaction only the definition of the content of the transaction and the target receiving that content is retrieved versus all the algorithm in charge of manipulating, converting and preparing data to fit with the platform specificities). Retrieved semantics (full application understanding) is "What is done" versus "How it is done". Indeed nowadays design and coding principles have significantly changes, due to the difference in programming languages capabilities and level of abstraction (libraries for data and time, transaction management, programming language running on JVM, object paradigm versus data paradigm, framework such as JPA). As a consequence the volume of artifacts to be modernized is significantly reduced, refactoring is simplified and contextual ambiguities can be better resolved.

FIG. 6d represents the results of UML2 model obtained from the KDM model of FIG. 6c
Reverse/Forward The component in charge of defining all transformations (Concepts, Rules, Triggering conditions) and associated technology to configure and execute transformations (graphical user interface, rules engine) and to save results of transformation (source code configuration management and model configuration management) is the Knowledge Base Factory. This component is split into two sub components:
  Reverse (engineering) Knowledge Base: this component defines all transformation in charge of extracting the application logic and data structure from legacy artifacts toward UML2 Platform-Independent Models.

Forward (engineering) Knowledge Base: this component defines all transformations in charge of transforming UML2 Platform-Independent Models into a SOA and Object-Oriented implementation ready to execute (100% code generation).

Thus, when obtaining UML2 models, a first phase named "Reverse" is achieved.

The final step (f) of generating the second code instructions in the second language from the meta-model is the "Forward" phase. A component for each phase is comprised in the KB.

FIG. 6e represents a line of Java generated from the UML2 model of FIG. 6d. It is equivalent to the COBOL line of FIG. 6a.

Code generation is based on recovered UML2 models. Those models are Platform-Independent Models with additional constraints that have been automatically created by the KDM to UML2 transformation rules. Those constraints are UML2 stereotypes (semantic tags for short) used for adding semantic information; in fact, one formally forces the compliance of the UML2 models with object-oriented code base (UML2 is not a programming language and cannot be natively compiled without annotations that guide compilation). Therefore the Knowledge Base describing UML2 concepts and associated transformations has been designed so that UML2 is restricted to a concise (canonical) formalism really capable of a 100% automated transformation: from fully interpretable UML2 models to code and configuration files dedicated to a modern platform. Therefore all legacy application behavior and logic are transformed into the new code base; there is no need for any manual handwriting of the target code base. This is uncommon in model driven technologies where code generation is only code template production with manual completion.

Database Modernization

As already explained, legacy artifacts often comprise a first database used by the first code instructions. In other words, the first code instructions are associated with a first database in a first format compatible with the first programming language.

In such a case, the method may comprise a further step (g) of converting the first database into a second database in a second format compatible with the second programming language.

The Database and Data Modernization tools are similar to Reverse Modeling tools.

They are an execution engine that runs transformations defined into the KB. However transformations are specialized because of a special focus on database and data modernization. The main goals are:

Create target database schema (relational database),
Normalize the target schema,
Convert the legacy schema toward the new schema (the legacy schema must not be relational, it can be based on files, hierarchical databases, network databases, or relational databases with or without, normal form),
Generate all ETL programs to migrate the legacy data into the new database,
Extract data structure definition to UML2 models (namely class diagrams) and to synchronize UML2 models produced by Reverse Modeling.

In particular, there are in the KB predefined transformations to analyze the first database and identify data structure which are not compliant to the third normal form (3NF).

Then, a UML2 class diagram that matches with the target database schema is created. This class diagram is synchronized in order to refactor KDM and UML2 models. Indeed objects consumed by the application logic are stored into databases using transactions. The extracted class diagram is used to map objects in application logic with objects used for storage.

Schema of the target database is generated from dedicated transformations.

Database and Data Modernization also rely on an semantic annotation editor which performs the same functionality as defined previously. However the concepts, transformations and annotations are specific to database transformations.

Batch Testing

When modernizing applications it is important to have means to ensure that both the first and second codes are equivalent. Since most of applications requiring to be modernized (versus replacement or retirement) are critical applications, the validation criteria are that the same input produces the same output. Traceability and compilation is not enough.

This is achieved through testing. Therefore, the method may comprising a further step (h) of executing the first code instructions on a sample first database, executing the second code instructions on a sample second database, and comparing respective results so as to test the reliability of the second code instructions.

However, while testing of screens is easy and can be automated using existing technology, batch testing is different. Indeed there is no screen to snapshot and compare with and the volume of data is very significant. It is not rare that the result of a batch chain, executed daily, produces multiple hundreds of gigabytes, even terabytes of data.

Comparing this amount of data, usually stored in difficult to read format, requires automations.

Thus, the method enables indicating data set location for comparing execution results of first programming language batches with second programming language batches. This allows a non-human (error prone) comparison of produced results.

User Interface

As already explained, the present method allows fully automated migration: all first code artifacts are modernized automatically; there is no need for manual coding of any component of the modernized software.

However, the method allows users of the modernization system to control and adapt (if desired) transformation rules.

As already explained, the method is not limited to refactoring, but also allows refining, i.e. adding functionalities. In such a case, step (e) comprises a further step (e1) of modifying said meta-model so as to enhance functionalities of the first code instructions. It implies intervention of the user though the interface means.

Furthermore, when facing legacy artifacts that require specific transformations, the modernization system provides "views" and "wizards" to analyze recovered models and applies transformation rules based on human decision or design pattern matching.

KDM models, associated views and wizards as well enable visualizing the architecture and detailed structure (data and control flows) of the application to be modernized. KDM models can be impacted when adding new transformation rules, enriching KDM elements with user-defined information, enriching automatically KDM elements with pattern matching rules.

UML2 models which are produced from KDM models. UML2 elements may then be shared and reused for matching KDM patterns to already recovered UML2 model pieces.

Figure 5:
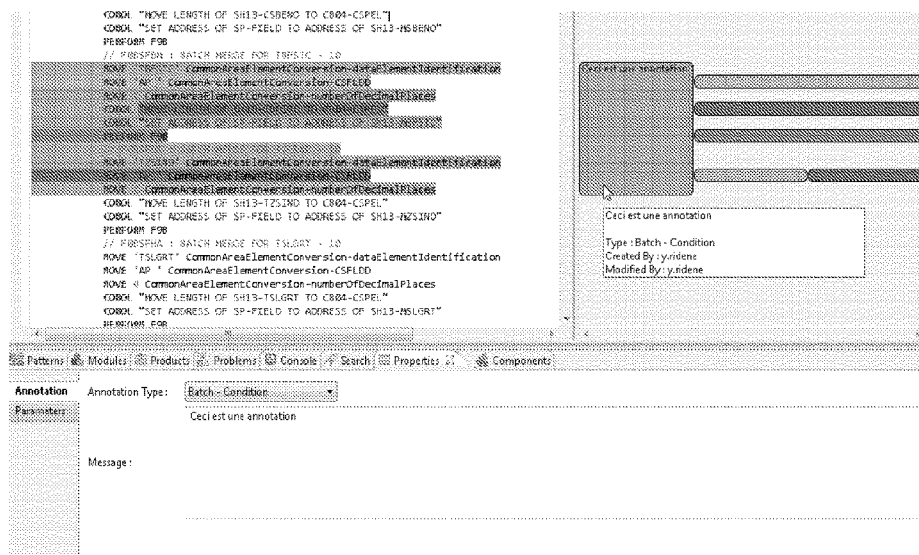
FIG. 5 is an example of interface for user interaction in the method according to the invention.

Actions are performed through wizards, which of an example if represented by FIG. 5:

TOM (Transient Object Modernization):
  TOM is used to apply transformation to data structure to create object class definition and associated instances. TOM is used for transient object (objects in memory). TOM imports persistent object class definition from database modernization model and establishes the mapping with transient objects.

Pattern editor (design pattern definition and matching):
  It analyzes KDM models to propose potential patterns; allows defining patterns, supports pattern matching against KDM, and allows validating and rejecting matches; allows undo if matched elements need to be unmatched. Finally, it binds matched patterns to UML2 elements.

Transmodeling (transformation from KDM to UML2) wizard:
  This wizard launches the KDM to UML2 transformations. It allows the following:
  Refactoring of signatures and names: all services to be created are displayed and the user may validate suggested signatures or change them,
  Missing mapping analysis: prior to executing transformation to UML2, the transmodeling wizard validates whether all legacy data structures are mapped to object classes and Instances or if there are missing mappings. The user may decide either to pursue the transformation—in which case later transformation will be required to add missing mappings and to update extracted UML2 models—or to stop the transformation in order to solve missing mappings.
  On the fly data mapping: the transmodeling wizard feature allows fixing "on the fly" missing mappings by pointing to already extracted class definitions and by binding data structures to object classes.
  UML2 extraction: the transmodeling wizard launches and executes KDM to UML2 transformations.

Semantic tag editor (the wizard of FIG. 5)
  In complement of pattern recognition to automatically add semantic tag, the annotation editor allows users marking KDM models with supplementary semantic tags. It facilitates transmodeling by annotating automatically KDM models; this leads to synchronize KDM and UML2 when new transformations occur.

As previously explained the semantic tag editor allows enriching KDM models with additional semantic information.
  The editor may be used to either:
  Have the user selected items and to add annotations,
  Visualize results of automatically created annotations:
    Created by pattern recognition,
    Created by transmodeling.

Moreover the annotation editor allows defining new annotation and pushing these to the Knowledge Base.
  New annotations may be used to:
  Add information to manage the project and share comments between members of the modernization project. Those annotations do not modify transformations.
  Add information to implement new transformations. In such a case annotations may be used to:
  Add conditional information for managing different flows of transformation,
  Add information that is consumed to produce new artifacts,
  Overlay metadata (properties of KDM and UML2 elements) of a specific KDM element with the information embedded into the annotation.

Knowledge Base Improvement
  Advantageously, the KB is a customisable base. Thus, the KB may be updated to manage legacy application coding practices specificities and/or new language constructs. This can be done in two ways:
  Top down approach: from the central Knowledge Base to publish new concepts and transformations to all instances of the modernization system,
  Bottom up approach: from instances of the modernization system to publish and share new design patterns and/or annotations used for refactoring. Those elements may then be reused, enriched, made generic and published to all instances of the modernization system.

Modification of the knowledge base may be suggested to a user when unknown design patterns are identified.

Besides, typically new concepts are required when:
  A new language or database technology is added to the reverse Knowledge Base. In this case, a new meta-model and associated concepts must be created to match with the output of the parser (ASTM model matching AST structure),
  Facing variation of language, for instance COBOL is a language supporting multiple and different dialects. One dialect may introduce new concepts on top of the common grammar,
  Facing new architectural concepts (introducing a new type of database technology such as NoSQL for instance, or introducing event programming when the Reverse Knowledge Base contains only synchronous calls),
  A language update (for instance support of Java 7 on top of Java 6) requires updating the Knowledge Base with new concrete implementation code templates.
  Facing new target architecture framework (e.g., Java Server Faces v.2, Winforms).

If concepts are added or modified in the KB to manage new semantic elements then transformations may need to be updated. It is also possible to add new transformations even if there has been no modification of concepts.

Typically transformation update is required when:
  Concepts have been updated or added and are introducing new semantics or new architectural capabilities,
  Existing concepts happen to have multiple-shape semantics and new transformations are required to solve ambiguities.

Transformations use concepts stored in the Knowledge Base in order to:
  Convert legacy code base and database into technical models (abstract syntax trees mapping to ASTM and KDM), this happens to enable model-to-model transformations,
  Refine platform-dependant model to produce architectural models,
  Refactor and refine architectural models with semantic annotations which influence transformation execution decision and implementation to produce enriched architectural models,
  Produce platform-independent UML2 models. Those UML2 models are using stereotypes so that those models are "executable",
  Automatically and fully produce all the new application artifacts (both code and database) based on the target application choice.

All transformations are defined in the Knowledge Base Factory (design environment). Then they are provisioned into the Reverse Modeling and Forward Engineering (execution environment) to be executed. The Reverse Modeling and Forward Engineering framework is an execution engine that executes transformations defined at a higher level. However the Reverse Modeling and Forward Engineering possess the analyzing and annotation feature to manage ambiguities based on the Knowledge which is received from the Knowledge Base.

Transformations are managed with the following organization:

Module:
  A module defines the input and output meta-models. The may be multiple input meta-models and many output meta-models.
  A module contains transformations.
  Transformation choreography is defined by module.
Transformation:
  Input and output concepts are defined for each transformation,
  A transformation contains rules while rules contain the transformation logic for individual concepts and associated context.
  Transformation may be responsible for refactoring or refining.
Rule:
  A rule contains the transformation logic for a given set of concepts for a specific context. There are three types or rules:
    Direct (the transformation engine manages the choreography)
    Indirect (explicit call to another rule inside a rule)
    Init: rule with no associated input concept. Init rules execute whenever a transformation is executed.

The invention claimed is:

1. A method for generating second code instructions in a second programming language from first code instructions in a first programming language, characterized in that it comprises performing at a processing unit steps of:
  (a) providing the first code instructions, and parsing the first code instructions according to semantic rules of the first programming language so as to generate an abstract syntax tree of the first code instructions;
  (b) mapping the abstract syntax tree into an architectural model of the first code in a knowledge description language;
  (c) analysing the architectural model so as to identify for at least one element of the architectural model a design pattern matching said element of the architectural model, each design pattern being representative of an elementary software function of the first code instructions, elements of the architectural model which do not match any design pattern being ignored;
  (d) enriching the architectural model with semantic tags associated with the design patterns identified for elements of the architectural model, according to pattern matching rules, the semantic tags resolving semantic ambiguity within the architectural model;
  (e) transforming the tagged architectural model into a software modelling language independent from the first and second programming languages;
  (f) generating and storing, for implementation by a computer, into a memory the second code instructions in the second language from the software modelling language.

2. A method according to claim 1, wherein steps (b) to (f) are performed according to a knowledge base, said knowledge base describing:
  a list of concepts of the first programming language and of the second programming language, said concepts being expressed as meta-elements, meta-relationships and meta-rules;
  a list of elementary actions associated with concepts;
  a list of conditions for elementary actions triggering.

3. A method according to claim 2, wherein the knowledge base is a customisable base.

4. A method according to claim 3, wherein modification of the knowledge base is suggested to a user when unknown design patterns are identified.

5. A method according to claim 1, wherein the first code instructions are associated with a first database in a first format compatible with the first programming language, the method comprising a further step (g) of converting the first database into a second database in a second format compatible with the second programming language.

6. A method according to claim 5, comprising a further step (h) of executing the first code instructions on a sample first database, executing the second code instructions on a sample second database, and comparing respective results so as to test the reliability of the second code instructions.

7. A method according to claim 1, wherein step (e) comprises a further step (e1) of modifying said meta-model so as to enhance functionalities of the first code instructions.

8. A method according to claim 1, wherein said software modelling language is Unified Modelling Language (UML) 2.

9. A system for transforming first code instructions in a first programming language into second code instructions in a second programming language, the system comprising a processing unit configured for:
  (a) providing the first code instructions, and parsing the first code instructions according to semantic rules of the first programming language so as to generate an abstract syntax tree of the first code instructions;
  (b) mapping the abstract syntax tree into an architectural model of the first code in a knowledge description language,
  (c) analysing the architectural model so as to identify for at least one element of the architectural model a design pattern matching said element of the architectural model, each design pattern being representative of an elementary software function of the first code instructions, elements of the architectural model which do not match any design pattern being ignored;
  (d) enriching the architectural model with semantic tags associated with the design patterns identified for elements of the architectural model, according to pattern matching rules, the semantic tags resolving semantic ambiguity within the architectural model;
  (e) transforming the tagged architectural model into a software modelling language independent from the first and second programming languages;
  (f) generating and storing, for implementation by a computer, into a memory the second code instructions in the second language from the software modelling language.

* * * * *